July 15, 1958
E. B. SHERRON
2,843,165
SELF-PROPELLED LOGGING MACHINE FOR
CUTTING AND PROCESSING TREES
Filed March 29, 1955
7 Sheets-Sheet 1
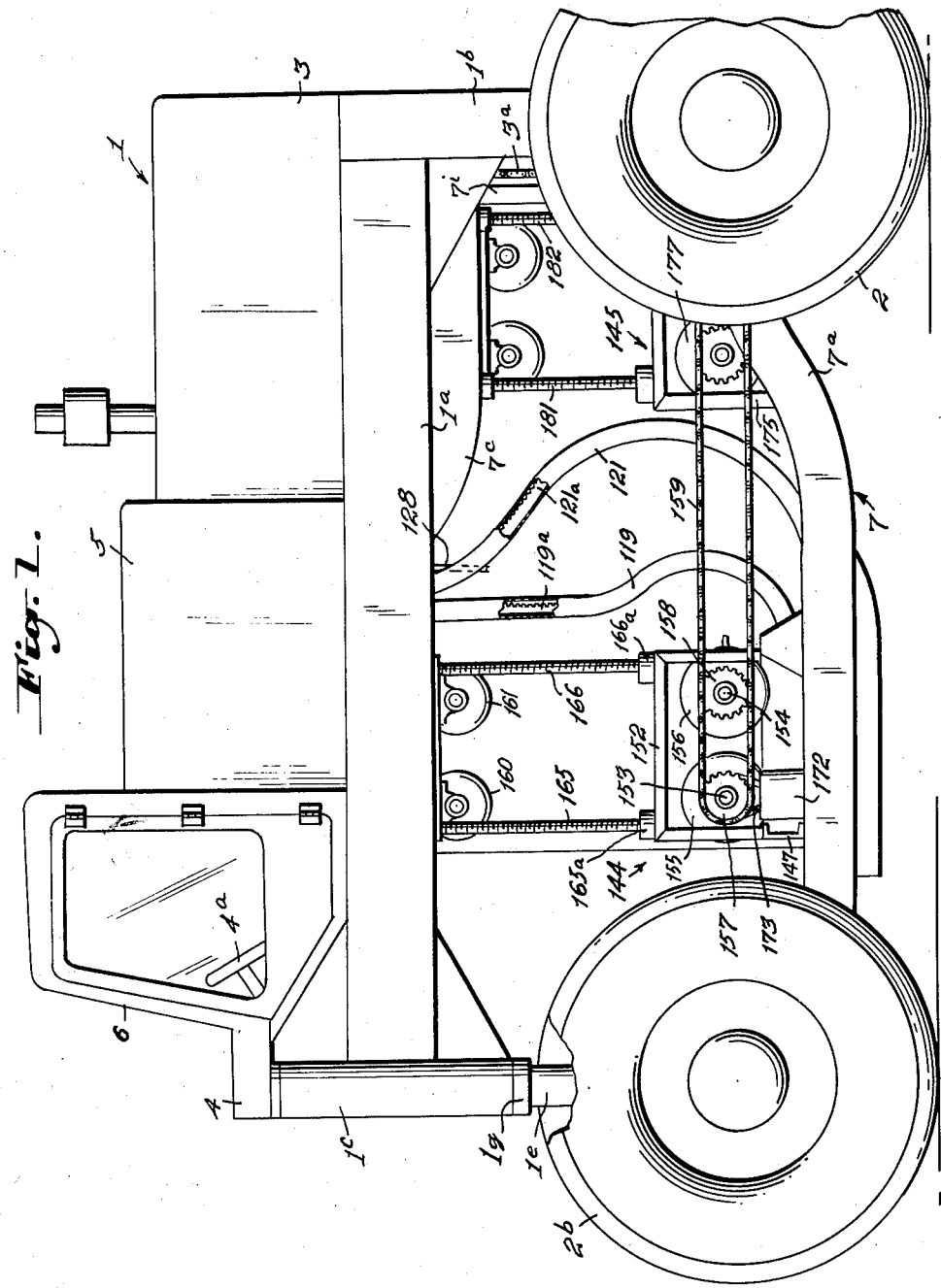
INVENTOR.
Emmitt B. Sherron
BY
Elizabeth Newton Dew
Attorney.

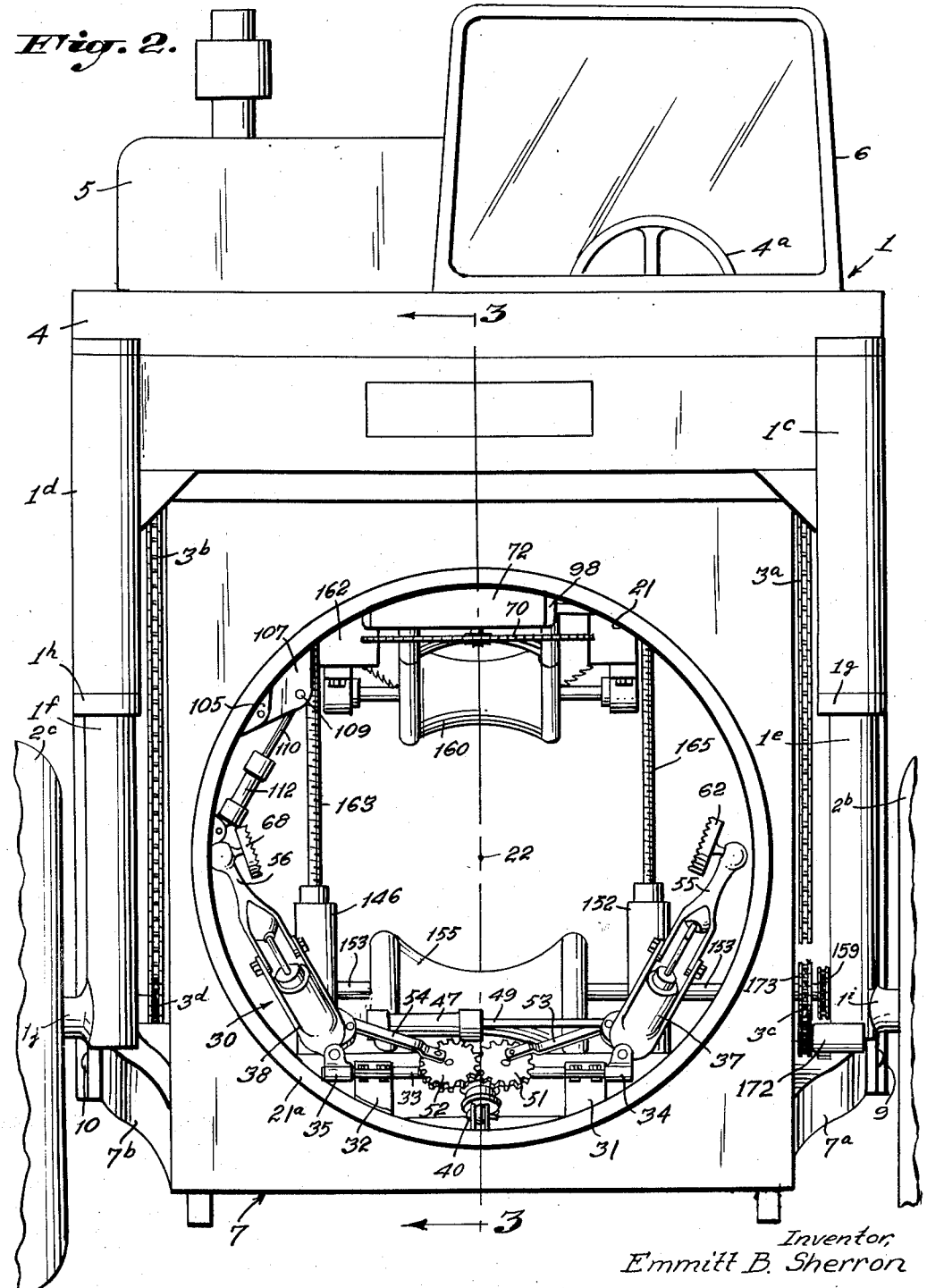

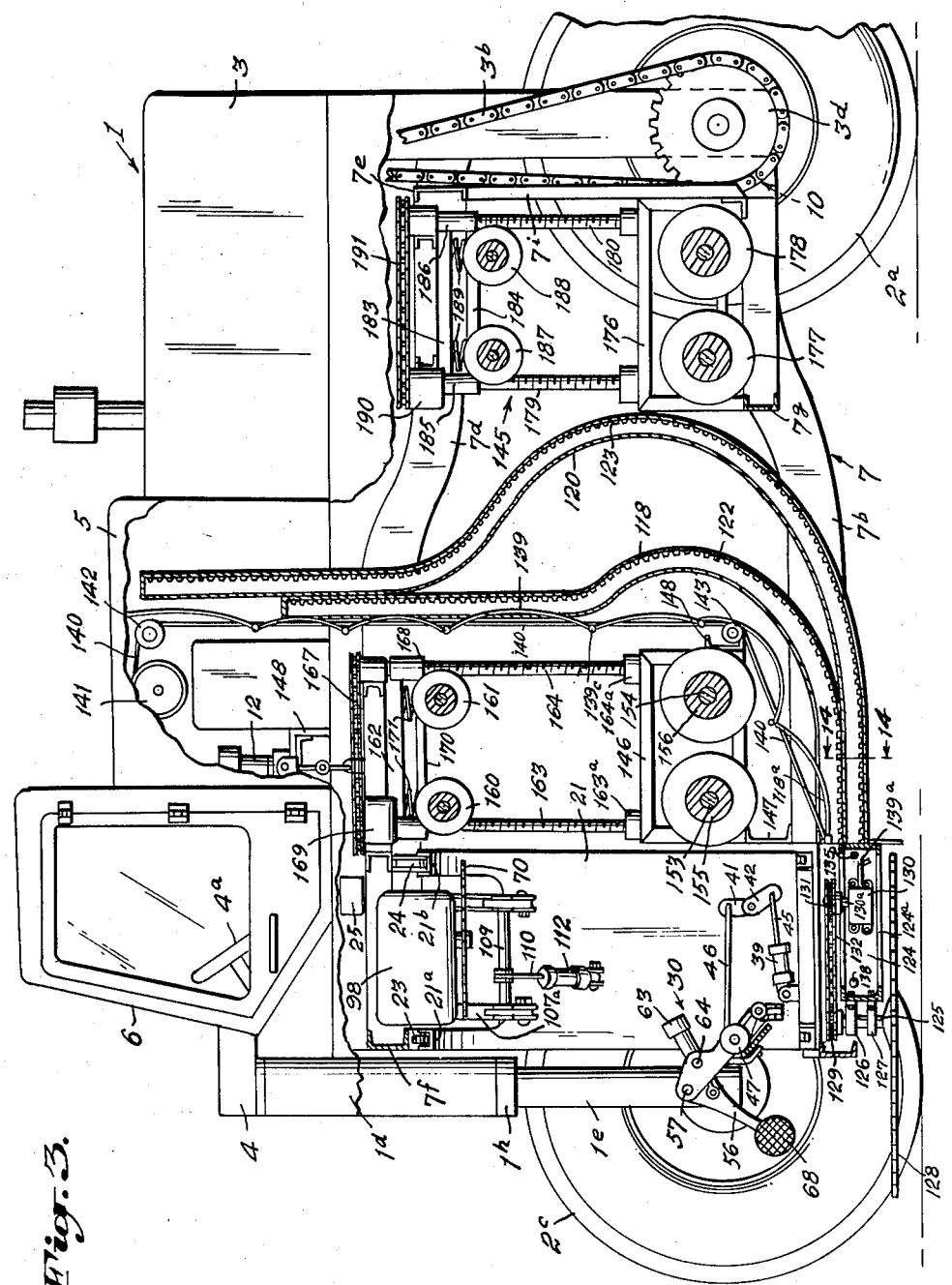

July 15, 1958
E. B. SHERRON
2,843,165
SELF-PROPELLED LOGGING MACHINE FOR
CUTTING AND PROCESSING TREES
Filed March 29, 1955
7 Sheets-Sheet 4
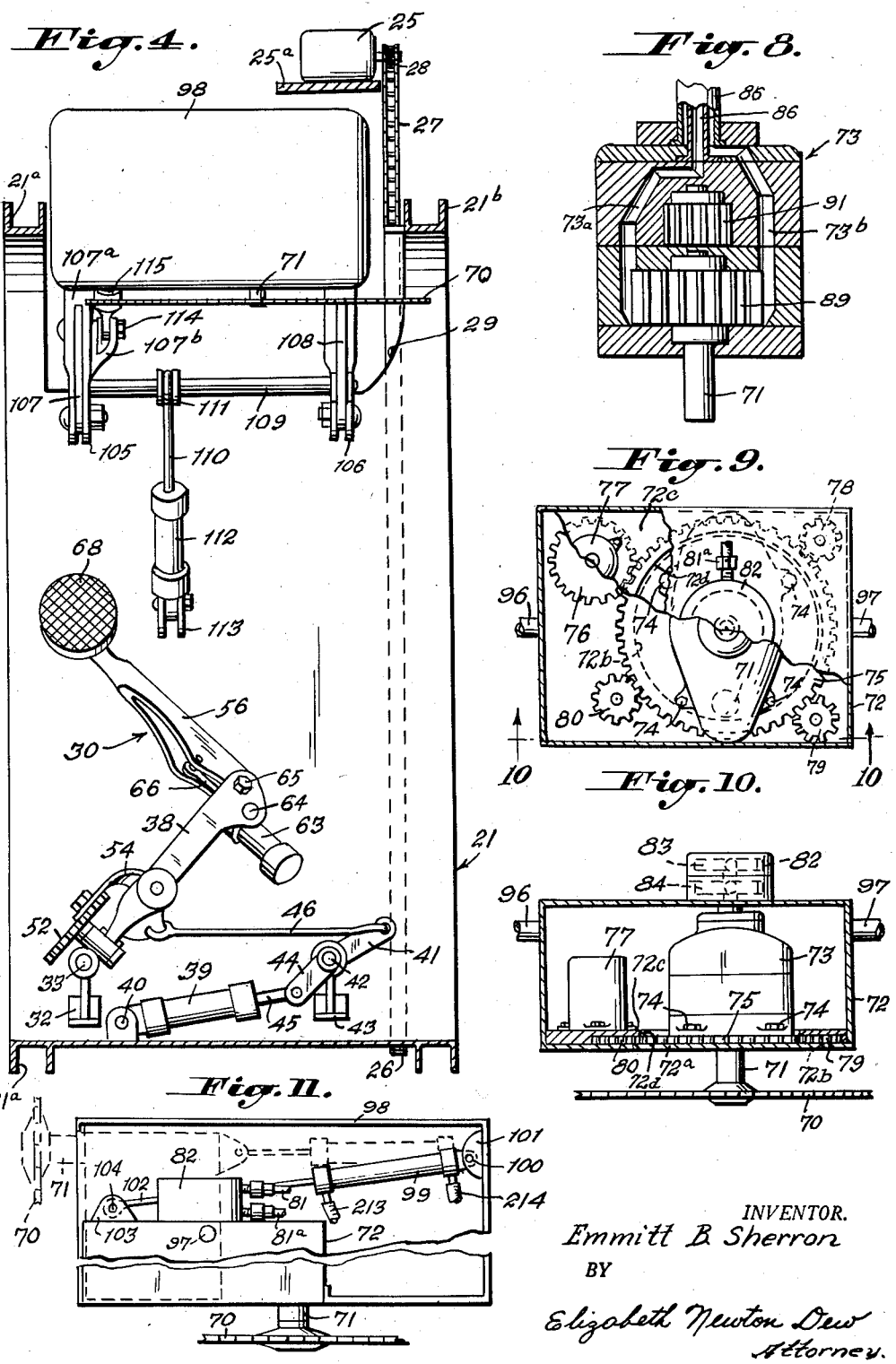
INVENTOR.
Emmitt B. Sherron
BY
Elizabeth Newton Dew
Attorney.

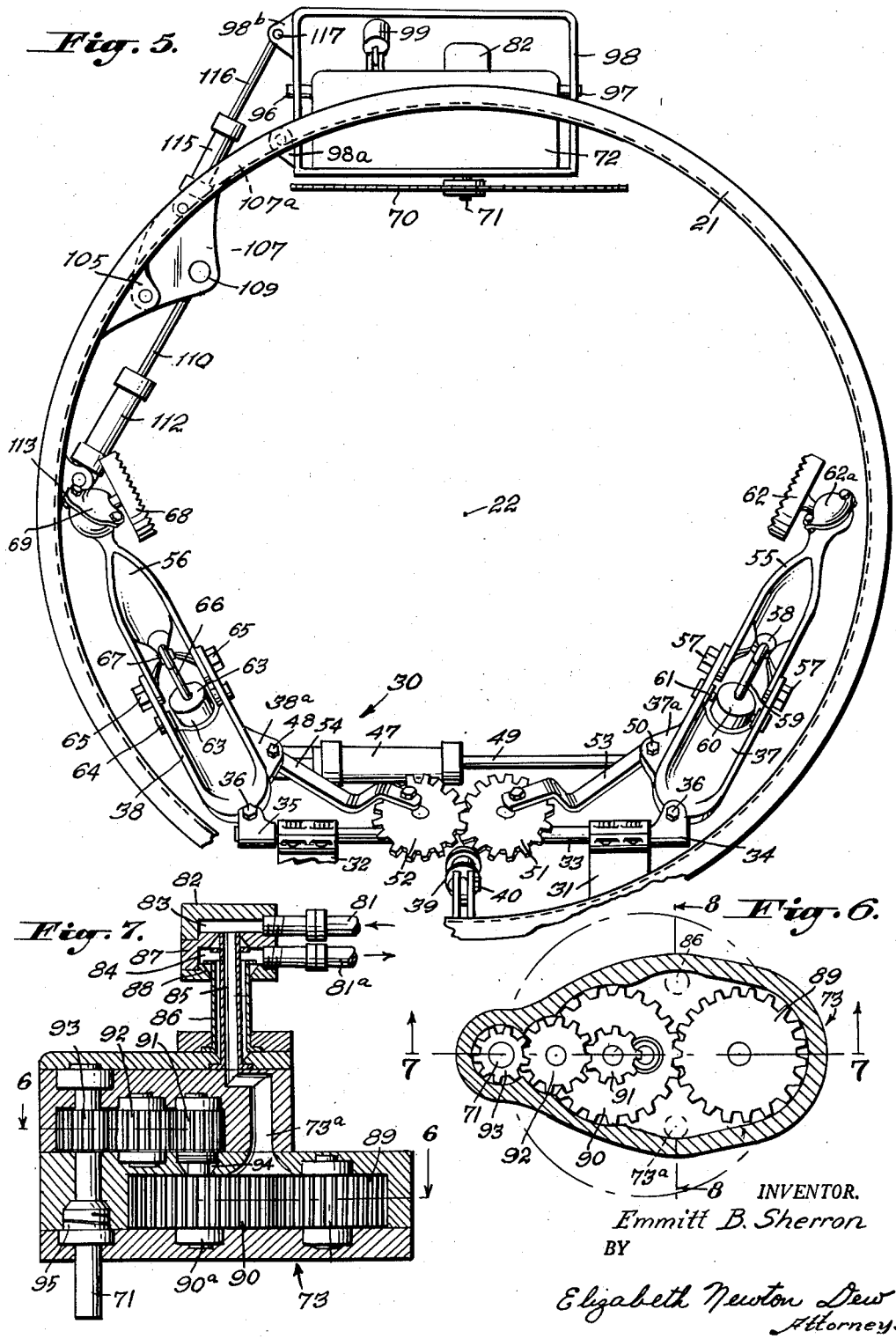

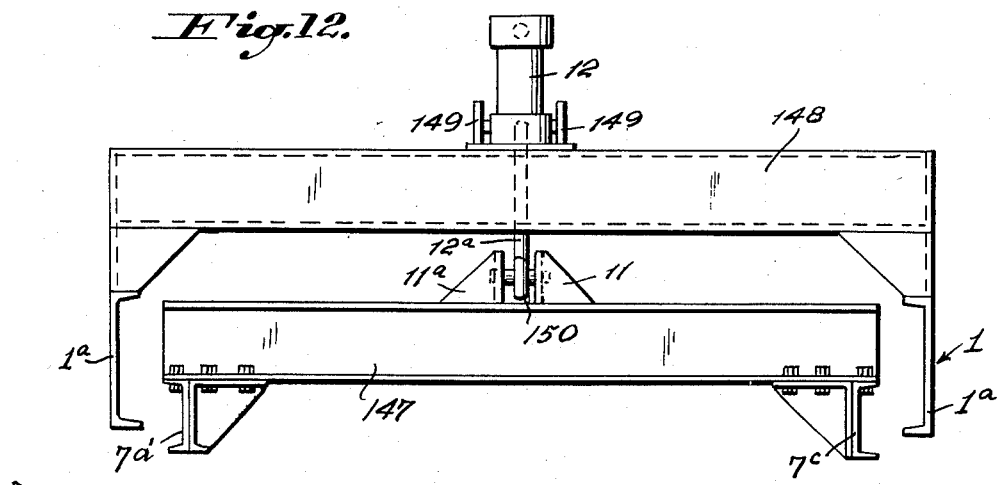
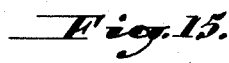
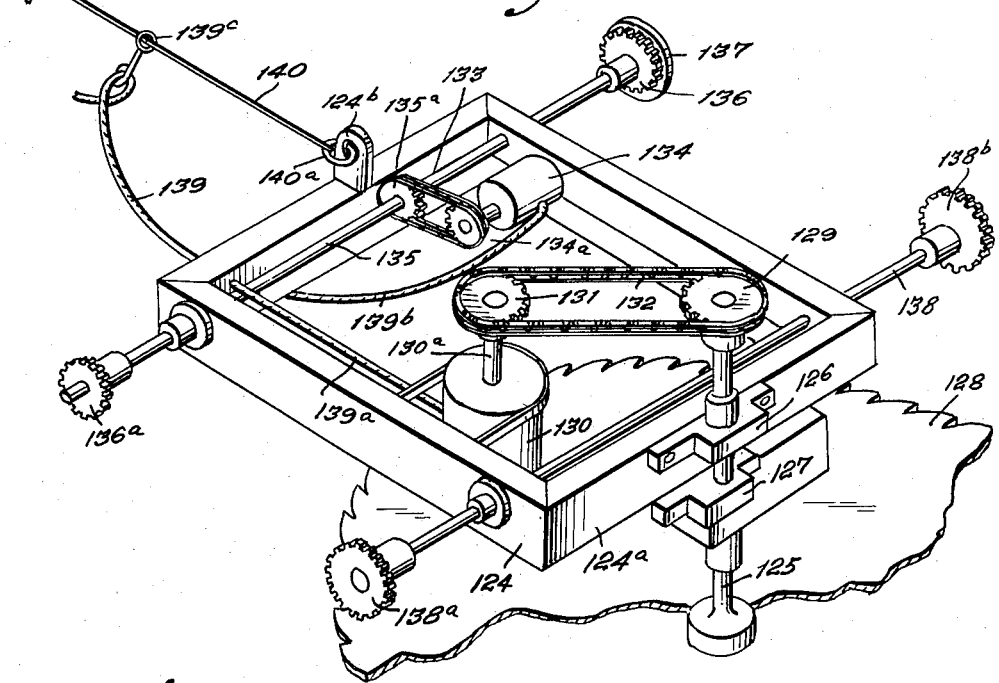
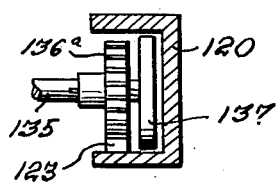
INVENTOR.
Emmitt B. Sherron
BY
Elizabeth Newton Dew
Attorneys.

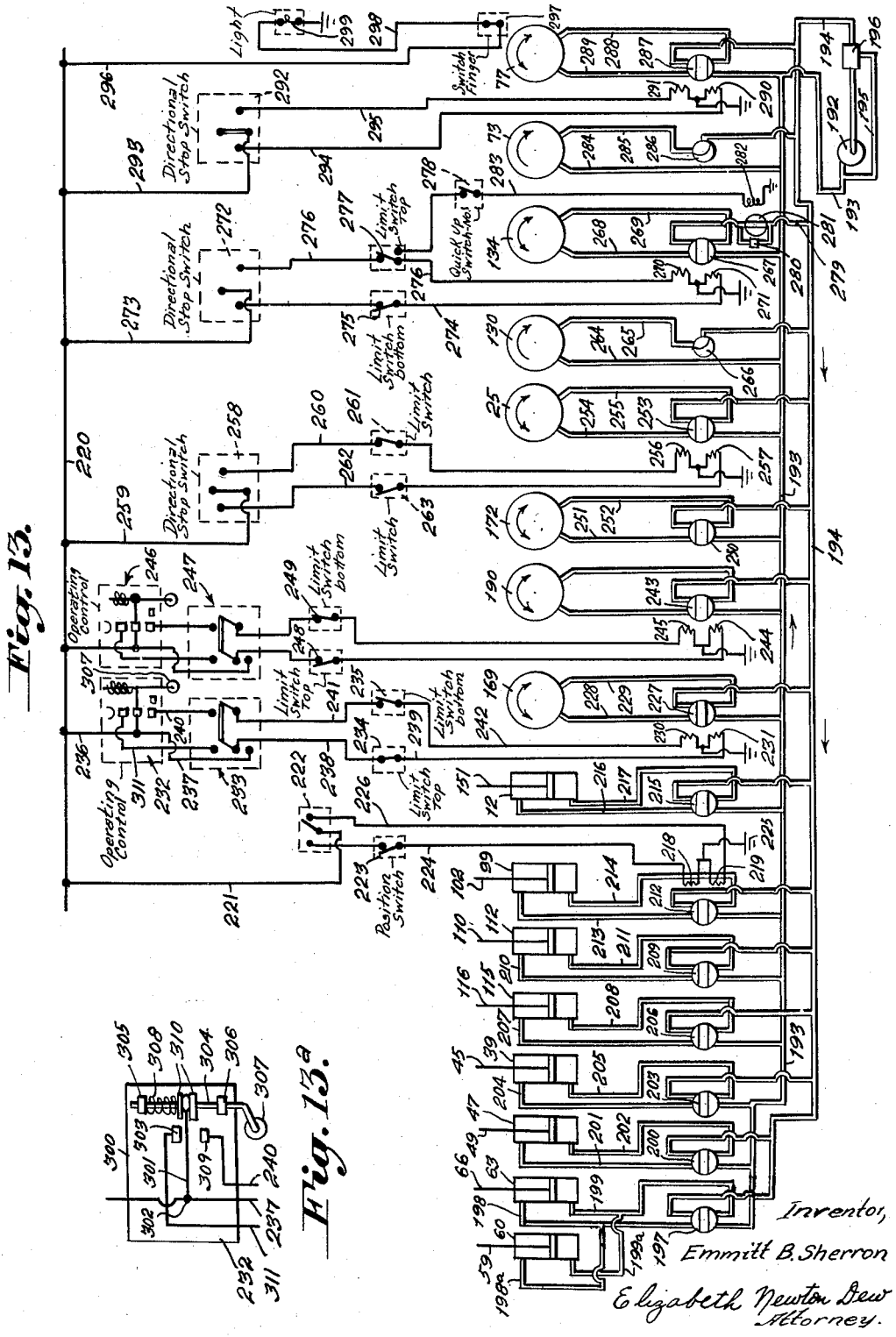

United States Patent Office 2,843,165
Patented July 15, 1958

2,843,165

SELF-PROPELLED LOGGING MACHINE FOR CUTTING AND PROCESSING TREES

Emmitt B. Sherron, Raleigh, N. C.

Application March 29, 1955, Serial No. 497,783

17 Claims. (Cl. 143—43)

This invention relates to a wheeled self-propelled vehicle intended more particularly to facilitate and greatly reduce labor overhead and other costs in the cutting, trimming and processing of timber intended for sawing into lumber and for other purposes. While the main purpose and object is as aforesaid it will become obvious as the description proceeds that the invention is capable of many other uses such as handling of telephone poles, posts and other elongated and/or tubular objects.

It is the principal object of the invention to provide a machine capable of moving under its own power through the forest, of grasping a tree trunk, severing the trunk as close to the ground as is practicable, drawing the severed trunk into the machine, trimming off the limbs, cutting the trimmed trunk into the same or different predetermined lengths, and depositing the severed lengths onto the ground, or upon an adjacent truck or platform.

Alternatively the machine may be used to convey the trimmed trunk directly to a sawmill, loading station or processing location and there sawing it into selected lengths.

Another object of the invention is to provide a machine as aforesaid wherein a cut-off saw may be projected forwardly of the vehicle to cut off a tree near the ground and which may be adjusted vertically to vary the distance of the cut from the ground, as desired.

A further object is to provide a rotating drum assembly carrying a pair of highly mobile hydraulically-operated trunk-engaging arms by which the trunk may be grasped, supported and manipulated as desired to draw the same into the machine to deposit it upon conveyor rollers forming a component part of the machine and to present the severed trunk to a saw for cutting off limbs as closely as desired.

A still further object is to provide in conjunction with a rotating drum as described in the preceding paragraph, a trimming saw together with a novel mounting enabling the saw to be manipulated through a wide range and variety of motions whereby it is rendered highly versatile in the smooth and rapid trimming of a severed tree trunk.

Still another object is to provide a mounting for the cut-off saw which enables its use subsequent to cut off and trimming, for severing the trimmed trunk into selective lengths.

A still further object is to provide in a wheeled vehicle of the type mentioned, power-driven roller or conveyor means capable of handling the severed trunk or portions thereof and depositing the same upon the ground; feeding the same to a sawmill or other processing plant, or loading the trunk or severed portions thereof upon a truck.

Another object is to provide a machine capable of the functions described in the preceding paragraphs in which the power for driving the various saws and trunk-handling components, is supplied by hydraulic motors supplied from a common source of pressure fluid and capable of rapid and precise control in all its functions under command of an operator in the cab of the vehicle.

Yet another object is to provide a machine as described in which all controls are centralized in the operator's compartment whereby all functions of the machine are effected and under the control of a single operator.

Other objects and advantages will be apparent to those skilled in the art after a study of the following description in connection with the accompanying drawings.

In the drawings:

Figure 1 is a side elevation of the machine showing the general arrangement and relation of the several main components, parts being broken away for greater clarity of illustration, Figure 2 is a front elevation of the vehicle showing the rotatable drum, the clamping arms carried thereby, the trimming saw and, more remotely, one pair of main conveyor rolls, Figure 3 is a central vertical section in a plane identified by line 3—3, Figure 2, Figure 4 is a central vertical section to an enlarged scale, of the rotating drum and parts carried thereby, corresponding to Figure 3, Figure 5 is a front elevation of the drum shown upon Figure 4 and corresponding to the position of the same part as shown in Figure 2, Figure 6 is a horizontal section of a preferred form of hydraulic motor for driving the trimming saw and taken in a plane identified by the line 6—6, Figure 7, Figure 7 is a central vertical section taken in a plane identified by the line 7—7, Figure 6, Figure 8 (sheet 4) is a vertical section taken on line 8—8, Figure 7, Figure 9 is a detail plan view to an enlarged scale and partly in section, of the hydraulic motor for driving the trimming saw and the adjustable power-controlled adjusting and manipulating means for this saw, Figure 10 is a vertical sectional view taken in a plane identified by line 10—10, Figure 9, Figure 11 is a vertical side elevation of the power-operated adjusting means, one side of the housing thereof being removed for clarity of illustration, Figure 12 (sheet 6) is a detail transverse elevation showing the mechanism by which the frame may be pivoted with respect to the chassis to vary the elevation of the forward end thereof above the ground, Figure 13 is a diagrammatic view of the hydraulic and electric circuit controls of the entire machine, Figure 13a is a schematic view of one of the two operating control switches for the presser rolls of the conveyor, Figure 14 (sheet 6) is a detail sectional view to an enlarged scale, taken upon the line 14—14 of Figure 3, and Figure 15 is a detail perspective view of the cut-off saw and its frame.

*The chassis*

Referring in detail to the drawings wherein like parts are identified by the same reference character throughout, 1 identifies a chassis of generally rectangular outline in plan including heavy side beams such as 1a, Figure 1, and verticals 1b rigidly secured to the chassis and forming a part thereof. These verticals are two in number and depend from the respective rearward corners of the frame. Pneumatic tired wheels 2 and 2a are independently journaled in suitable bearings mounted at the lower ends of the respective verticals. Considered apart from the other parts subsequently described, the chassis is entirely centrally open in the fore and aft direction.

An engine, not shown, such as conventional multi-cylinder Diesel or other known type of internal combustion engine is cradled at the top rear portion of the chassis, within a housing 3. The motor drives a conventional transmission which may be of the multi-speed sliding gear type in assembly with a clutch and differential having outputs driving chains 3a and 3b, Figures 1, 2 and 3. Each chain extends downwardly about and drives a gear 3c and 3d directly attached through shafts to the wheels 2 and 2a, respectively. On Figure 2 chain 3a is shown broken away at its lower end to avoid confusion with chain 173, subsequently described.

Referring to Figures 1, 2 and 3 in particular, it will be noted that the chassis 1 carries heavy hollow or tubular columns 1c and 1d depending from its front corners, respectively. King pins 1e and 1f have their upper ends journaled within the respective columns by bearings, not shown, and have respective flanges 1g and 1h fixed thereto with suitable antifriction thrust bearings to take the load. Each king pin is provided at its lower end with bearing shafts 1i and 1j journaling pneumatic-tired wheels 2b and 2c. Steering is effected by a mechanism contained within a housing 4 and which may consist simply of a pair of equal gear sectors centrally connected to the tops of the respective king pins 1e and 1f and each extending inwardly toward each other to mesh with a common, relatively small pinion. Steering is effected by a conventional steering mechanism acting upon the common pinion. For example, a worm gear is integrally connected with the common pinion and in mesh with a worm at one end of a steering column and a steering wheel 4a at the other within control cab 6.

It will be understood that king pins 1e and 1f may be positioned and relatively adjusted to give the usual caster, camber and toe-in to the wheels 2b and 2c, if such is desired or found necessary in practice.

An intermediate housing 5 is carried atop the central part of the chassis and houses equipment, fluid pumps and electrical and hydraulic controls under the control of an operator in cab 6 at steering wheel 4a, as will be subsequently explained.

The pivoted frame

A frame indicated generally at 7, Figures 1, 2 and 3 consists of a lower pair of transversely spaced longitudinal beams 7a and 7b and a corresponding pair of upper beams 7c and 7d. Each pair of beams is rigidly united at its rearward and forward ends, respectively, by transverse members such as 7e and 7f for the upper pair, and 7g, Figure 3, for the lower pair. Verticals such as 7i at the respective corners of the frame, separate and rigidly unite the upper and lower longitudinals to form a skeleton frame of generally paralellepipedal form. All four of the longitudinals 7b, etc., may be duplicate channels. As clearly shown upon Figures 2 and 3, each lower longitudinal from rear to front has a first straight section, then extends inwardly and downwardly and terminates forwardly in another straight section. As clearly shown upon Figure 3, each lower longitudinal is allochirally disposed with respect to its upper duplicate whereby the forward straight portions have a greater vertical separation than the corresponding rearward portions. As in the case of the chassis 1, all sections of frame 7 are united as by welding or riveting, into a very strong rigid and unitary structure.

The verticals 1b of the chassis are provided at their lower ends with transversely aligned brackets rigidly secured to their lower ends and forming pivot bearings 9, and 10, Figure 2, for the rearward end of frame 7, whereby the frame may be pivoted on an axis parallel with and a little forwardly of and below the axis of wheels 2 and 2a, as indicated approximately at 10, Figure 3, so that the forward end of the frame may be adjusted as to its height over the ground by pivoting about the axis 9–10.

As best shown upon Figure 12 the top longitudinals 7c and 7d are rigidly connected by a transversely-arranged beam 147 extending across the tops thereof. A pair of spaced brackets 11 and 11a carry a pivot pin 150 between them which passes through the apertured lower end of the piston rod 12a of a hydraulic power cylinder 12. This cylinder is carried atop transverse chassis beam 148 by a pair of spaced lugs 149 each mounting one of a pair of transversely aligned trunnions at the lower end of the motor cylinder. By the described construction, the admission of fluid under pressure above or below the piston within cylinder 12 and attached to rod 12a, under the control of the operator, raises or lowers the front end of frame 7, as desired, with respect to the ground, and correspondingly varies the height of the cut-off saw, later to be described.

The rotating drum and lifting arm assembly

A generally cylindrical drum 21 having its ends open, is carried by frame 7 at the forward end thereof and is journaled for rotation about its central axis 22 which axis, as the parts are shown in Figure 3, is, horizontally fore and aft. The drum is a sheet metal structure having channels 21a and 21b, Figures 3 and 4, integrally secured about its exterior surface at the forward and rearward circumferential edges thereof, respectively.

Guide rollers such as 23 and 24, at least four to each guide channel, are secured to brackets on frame 7 at equiangularly spaced points around the periphery and engage in their respective channels to mount the drum for guided rotation about axis 22.

The rotational position of the drum about its axis 22 is controlled by a hydraulic motor 25, Figures 3, 4 and 13, mounted on a plate 25a secured to frame 7 directly over the drum. The drum has a sprocket gear 26 extending about its circumference just forwardly of channel 21b and a chain 27 passes about this sprocket and a small sprocket wheel 28 on the shaft of motor 25 whereby, when the motor 25 is energized under control of the operator by means subsequently described, the drum is rotated to any position desired for processing of a tree.

Drum 21 carries a lifting arm assembly which under control of the operator, is adapted to grip a tree trunk being processed and to manipulate the same for that purpose beginning with the cutting down of the tree. The assembly is best shown in Figures 2, 3, 4, and 5 and is generally identified at 30.

A pair of brackets 31 and 32 are fixed in circumferentially spaced relation to the inner lower forward edge of drum 21 as viewed in Figure 5 and carry aligned bearings journaling a shaft 33 between them. As shown at Figure 5, the ends of the shaft project a short distance beyond the bearings and have keyed thereon a pair of sleeves 34 and 35 each of which has a pair of laterally projecting spaced lugs pivotally mounting, as by pins 36, the respective bight portions of a pair of clevises 37 and 38, whereby these clevises are pivotable about parallel axes normal to shaft 33. Referring more particularly to Figure 4 it will be noted that the cylinder 39 of a hydraulic motor has its base pivoted at 40 in a bracket attached to the lower inner surface of the drum midway between the brackets 31 and 32. A shaft 42 is journaled in brackets 43 only one of which is shown upon Figure 4, on an axis parallel to and rearwardly of that of shaft 33. Shaft 42 has a lever 44 fixed to its central portion and the end of the piston rod 45 of cylinder 39 is pivotally connected with the distal end of this lever. Near its ends, shaft 42 has a pair of parallel levers 41 each of which is connected by link 46 with a corresponding one of clevises 37 and 38. By this construction, when pressure fluid is admitted to cylinder 39 by valve mechanism subsequently described, the resulting movement of rod 45 effects a corresponding pivotal movement in unison of the clevises and shaft 33 about the axis of that shaft.

As best shown at Figure 5, the two clevises 37 and 38 have lugs 37a and 38a offset from their pivot axes and facing one another. A hydraulic power cylinder 47 has its base pivoted at 48 to lug 38a while the piston rod 49 of the cylinder has its end pivoted at 50 to lug 37a. Pivots 36, 48, and 50 are all parallel, and perpendicular to shaft 33 so that the introduction of pressure fluid to cylinder 47 causes the clevises to pivot in opposite directions about their pivot pins 36. The pivotal movement of the clevises is maintained equal by any suitable mechanism, shown as a pair of intermeshing gears or gear segments 51 and 52 centrally pivoted at spaced positions on shaft 33 and each having a pitman 53 and 54 pivoted to it in position radially offset from its center. The other ends of the pitmen are pivoted to the lugs 37a and 38a by the pivots 48 and 50 already described. Therefore, in a manner obvious from inspection of Figure 5, the clevises are constrained to equal and opposite pivotal movement on introduction of fluid under pressure to cylinder 47.

Right and left arms 55 and 56 are pivoted to the free ends of the clevises 37 and 38, respectively, whereby the arms are pivotable about axes perpendicular to the axes of pivots 36. Thus, referring to Figure 5, arm 56 is bifurcated at its pivoted end to form spaced lugs which fit between the arms of clevis 38 and are pivoted thereto by pivot pins or bolts 65.

As best shown upon Figures 3 and 5, the projections are widened transversely of their lengths at locations near the pivot axes and bent inwardly toward one another to form between them a support for a wrist pin 67, forming a pivot connection for a rod 66 of a piston sliding within a power cylinder 63. This cylinder is journaled as at 64 at its end from which rod 66 emerges, by and between the arms of clevis 38. Thus referring to Figure 3, admission of pressure fluid to cylinder 63 under control of the operator causes pivotal motion of arm 56 to increase the effective length of the combined clevis and arm relatively to pivot pin 36. At its free end arm 56 is provided with a socket in which is retained the ball 69 of a clamping disk 68 having a serrated circular face to contact and hold the trunk of a tree during and after cutting. Since the arm 55 pivoted on the other clevis 37 and parts carried by the arm, are in all respects similar to the corresponding parts just described, it is sufficient, referring to Figure 5, to identify hydraulic motor cylinder 60 pivoted to the clevis 37 at 61, the pivot pins 57 connecting clevis 37 and arm 55, connecting rod 59 pivoted at 58 to arm 55, clamping disk 62 and ball and socket 62a connecting it with arm 55.

By construction described in the foregoing paragraphs, the clamping disks 62 and 68 are mounted for universal pivotal movement about three mutually normal axes, the first of which is the axis of shaft 33, the second, the axis of pivot pins 36 normal to the first axis, and the third, the axis of pivots 57 and 65 each of which is at all times normal to its respective axis 36. Thus the elevation of clamping disks 62 and 68 may be controlled by admission of pressure fluid to one side or the other of the piston in cylinder 39, their distance of separation is controlled by power cylinder 47 and their position axially of the drum or what is the same thing, longitudinally of the vehicle, is generally controlled by cylinders 60 and 63. Of course, the definitions just given are only generally correct. For example, energization of motor 39 can also be used to vary the positions of the clamping disks longitudinally. The point it is desired to emphasize is that the clamping disks by proper simultaneous or sequential actuation of the four power cylinders 39, 47, 60 and 63 under control of the operator as subsequently described, can be universally moved to clamp a tree trunk between them while being severed or after severing, and then moved, while still clamping the trunk, to draw the same into and through the drum until engaged by the conveyor rolls, also subsequently described. It should be stated that the ball and socket joints 62a and 69 have enough friction to retain the clamping discs in adjusted position but not enough to prevent them from self-adjustment to surface of a tree trunk when brought into clamping relation relatively thereto and, of course, pivoting relatively to the fore-arms 55 and 56. Also, power cylinders 60 and 63 are controlled from a common fluid valve so that synchronous movement of the arms 55 and 56 is effected.

The clamping arm assembly just described, is per se, of general utility apart from its association in the logging machine, and forms the subject of my divisional application Serial Number 735,035, filed May 13, 1958.

*The trimming saw of the rotating drum assembly*

A circular saw 70 is provided for cutting off limbs of a trunk after the trunk has been severed and drawn into the machine by the mechanism described in the preceding section.

Referring more particularly to Figures 3, 4, 5, 6, 7, 8, 9, 10 and 11, the saw 70 is shown to be demountably fixed upon the shaft 71 of a hydraulic motor 73 whose casing is journaled within an inner housing 72. As best seen in Figures 9 and 10, the casing of this motor is provided with a flat base secured by four cap screws 74 to a relatively large gear 75 rotatably mounted upon the base 72a of inner housing 72 and having a hole for the passage of the shaft 71. The gear is in mesh with a pinion 76 fixed to the driven shaft of a hydraulic motor 77 positioned on an intermediate plate 72c having a large circular opening 72d, as clearly shown upon Figures 9 and 10. Three idler gears 78, 79 and 80 are journaled on the base 72a in equiangularly-spaced relation with pinion 76 and with each other and are in mesh with gear 75 whereby, in response to the energizing of motor 77, the motor 73 is rotated about the axis of gear 75, which axis, it will be noted is eccentric or offset with respect to the axis of shaft 71 of saw blade 70. A circular opening 72b, Figure 9, is provided in the base of housing 72 to accommodate revolution of shaft 71 about the axis of gear 75.

Referring more particularly to Figures 7 and 8, pressure fluid is conducted to and from motor 73 by flexible hose 81 and 81a connected to a gland head 82 having fluid chambers 83 and 84 with which the respective hose are in communication by conventional couplings.

A central supply tube 85 has its upper end connected with chamber 83 by a gland 87 and extends into supply passage 73a of the motor 73. A second and larger exhaust tube 86 is mounted coaxially about tube 85 and has its upper end in communication with chamber 84 through gland 88 and leads from exhaust passage 73b, Figure 8, of the motor. It will be understood, of course, that tubes 85 and 86 are coaxial of gear 75 and, also, that gland head 82 is fixed with respect to inner housing 72, as shown upon Figures 10 and 11.

The fluid motor 73 is shown as of the gear type having intermeshing impeller gears 89 and 90. See Figures 6 and 7. Gear 90 has a shaft 90a which extends upwardly into the upper portion of the casing and has a pinion 91 fixed thereto. From pinion 91 the drive proceeds by way of pinions 92 and 93, the latter being keyed on saw shaft 71, previously described. Fluid seals 94 and 95 about shafts 90a and 71, respectively, prevent the leakage of pressure fluid from the motor chamber.

By the construction just described fluid under pressure is introduced into motor 73 through flexible hose 81, drives gears 89 and 90 at very high speed to corresponding drive saw 70, and is exhausted by way of hose coupling 81a. At the same time the motor 73 may be rotated about the axis of tubes 85 and 86 under the control of motor 77 to move saw 70 into or relatively to the work.

Inner housing 72 has aligned trunnions 96 and 97, Figures 9 and 10, fixed to the upper central portion of its opposite side walls and which are journaled in bearings in the walls of an outer housing 98 which appears in Figures 2 through 5. The axis defined by trunnions 96 and 97 is at right angles to the fore and aft center line of the machine and is horizontal when the drum 21 is in the position shown upon Figures 2 and 3.

A hydraulic power cylinder 99, Figure 11, is pivoted at one end at 100, to a bracket 101 affixed to the inside wall of the outer housing 98. A piston rod 102 extends from a piston within cylinder 99 to pivotal connection at 104 with a bracket 103 attached to the top of inner housing 72. Flexible pressure connections, 213 and 214, Figure 11, extend to the two ends of the cylinder 99 so that in response to admission of pressure fluid to one end or the other of the cylinder, a pivotal movement of the inner housing and saw is effected about the axis of trunnions 96 and 97. As indicated in dotted lines upon Figure 11, the pivotal movement is about 90° so that the saw may be varied between a position parallel to central axis 22, to a position perpendicular thereto. Suitable stops, not shown, may be provided if desired to prevent movement of the inner housing 72 beyond the two extreme positions shown upon Figure 11 with respect to outer housing 98.

From Figure 4 it will be noted that outer housing 98 is mounted within a large opening 29 in the wall of drum 21. A pair of brackets 105 and 106 are fixed to the right inside wall of the drum and conjointly define an axis parallel with and radially offset from the axis 22 of drum 21. A pair of flat mounting plates 107 and 108, generally triangular in shape are pivoted at one corner in a respective bracket 105 and 106. See also Figure 5. The plates are rigidly interconnected by a rod 109 which has one end of a piston rod 110 pivoted thereto at 111. The rod is a component part of a hydraulic power device including a cylinder 112 pivoted at its other end to a bracket 113 rigidly attached to the inner periphery of drum 21 as will be clear from inspection of Figures 4 and 5.

Mounting plates 107 and 108 are duplicates and are provided with integral arcuate fingers or extensions such as 107a, Figure 4, each of which is pivotally connected with a respective one of two brackets 98a rigidly attached to the contiguous lower corner of outer housing 98. By this construction, housing 98 and the parts carried thereby, including saw 70, are pivoted about the pivot axis defined by brackets 105 and 106 in one direction or the other, by a corresponding admission of pressure fluid to piston 112. In an obvious manner, this movement of the saw varies its distance from the center line 22 of drum 21, whereby the saw may be adjusted for the radial distance of a limb to be severed from the trunk.

Bracket 107 which is the forward one of the two brackets 107 and 108 has a rearwardly and laterally offset projection 107b, Figure 4, to which is pivoted by pivot 114, the lower end of a hydraulic power cylinder or jack 115 (Figure 5). The piston rod 116 of this cylinder is pivoted at 117 to and between the arms of a bracket 98b affixed to the upper forward edge of outer housing 98. When hydraulic pressure fluid is admitted to either end of cylinder 115, the corresponding actuation of rod 116 pivots housing 98 and saw 70 about the axis defined by brackets 98a and varies the angle which the plane of the saw makes with the horizontal plane through the longitudinal axis of the machine.

By the construction described in this chapter, saw blade 70 is driven at high speed and is simultaneously and positively adjustable by actuation of motor 77 and cylinders 99, 112 and 115, individually or in any combination or sequence, to (1) revolve saw shaft 71 about the axis of gear 75 to vary its transverse and fore and aft positions with respect to the center line of drum 21, (2) to tilt saw 70 to any angular position between two limiting positions, one parallel with the center line of the drum and the other perpendicular to the center line, (3) tilt the saw about the normally horizontal fore and aft axis of brackets 98a to any position between substantially horizontal as shown upon Figure 5 and vertical, and (4) shift the saw substantially radially of axis 22 to vary the distance therefrom.

All motors are under instantaneous control of the operator and can be operated in any sequence to move the saw to a position wherein operation of motor 77 while the saw is rotating will sever a limb flush with, or closely adjacent the tree trunk while the same is held between in the conveyor rolls 68 and, if necessary, moved thereby. Control is facilitated by the rotatable feature of drum 21, under control of motor 25 and the conveyor rollers subsequently described.

The cut-off saw assembly

When the implement is moved up to a tree to be cut, the tree must be severed after being firmly gripped between clamping discs 62 and 68. Furthermore after severing, the trunk must be cut into appropriate lengths. These functions are effected by the main or cut-off saw whose mounting and operation will now be described.

Pivoted frame 7 has two pairs of curvilinear channel members 118, 119 and 120, 121 rigidly fixed therewith and shaped and relatively disposed as clearly shown upon Figures 1 and 3. The right channel members 118 and 120 of the two pairs appear upon Figure 3, while the left ones 119 and 121, appear upon Figure 1. From Figure 3 it will be seen that channel 118 beginning at the top within intermediate housing 5, extends substantially vertically downwardly to about the level of the axis 22 of drum 21, then curves rearwardly, downwardly and finally forwardly, terminating in a substantially straight horizontal run or pass 118a which ends just to the rear of crosspiece 7h of frame 7. The other channel member 119 of this pair appears upon Figure 1. From this figure it is noted that member 119 is an allochiral duplicate of 118 so that when positioned opposite member 118 the channels face each other and are coextensive and parallel.

Similarly the right channel 120 of the second pair extends from a position within housing 5, downwardly in a substantially vertical pass just to the rear of member 118 and then curves rearwardly, downwardly and forwardly in an arc of large radius to terminate in a normally horizontal pass ending to the rear of and a little below the terminus of member 118. The left member 121, Figure 1, is an allochiral duplicate of 120 and forms a pair therewith. As indicated in Figure 3 the channels are provided with respective racks 122 and 123 welded or otherwise secured along the inner surface of the rearward flanges. Members 119 and 121 are similarly equipped with racks 119a and 121a, Figure 1.

A main saw carriage 124, Figure 15, consists of a generally rectangular heavy frame including a channel 124a extending transversely across the front portion thereof. A saw shaft 125 is normally vertical as shown upon Figure 15 and is journaled in bearings 126 and 127 bolted to the front of the channel or cross member 124a. A large circular saw blade 128 is removably secured to the lower end of the shaft which also carries a driving sprocket 129 at its upper end. Hydraulic motor 130 is bolted to one side of frame 124 rearwardly of bearings 126, 127 and has a main shaft 130a carrying a sprocket 131. A chain 132 connects sprockets 131 and 129 in driving relation so that when motor 130 is energized as subsequently explained, the saw 128 is driven at high speed and, when moved forwardly into a tree, severs the same a distance above the ground determined by the position of frame 7 about the axis defined by pivot bearings 9 and 10 under control of power cylinder 12, as previously described.

A second hydraulic motor 134 is fixed to the other side of carriage 124 and drives a shaft 135 which projects transversely into each of the pair of channel members 120 and 121. Two pinions, 136 and 136a, Figure 15, are keyed to the respective ends of shaft 135 and each is held in mesh with the rack 121a and 123 of a respective channel by any appropriate means such as a roller member rolling along the opposite flange. Thus, referring to the details of Figure 14 wherein channel 120 is shown in cross section, shaft 135 has a roller 137 journaled on its end and which has a smooth fit between the flanges of the channel whereby, in an obvious manner, the pinion 136 is held in mesh with the rack 123.

Thus when motor 134 is energized the two pinions on the ends of the shaft 135 are driven through sprocket 134a, 135a and chain 133, and travel in synchronism along the channels 120 and 121 whereby the saw and its carriage are translated along and guided in a path determined by the channels.

When severing a tree at its base, the saw blade 128 must be subtantially horizontal while, when cutting the trunk into selected lengths, it must be raised and turned through 90° to lie in a vertical plane. Therefore, as the saw is moved from the raised or retracted position it must move in a plane perpendicular to the trunk until the lower or leading edge of the saw is near the single plane determined by the center lines of rollers 155, 156, 177 and 178. See Figures 1 and 3. At this point, as the saw frame continues its downward and forward movement the plane of the saw is rotated into parallelism with the ground. The two pairs of guide channels 118, 119 and 120, 121, are provided for this purpose and are so shaped and relatively disposed, as shown, positively to guide the saw frame and effect the desired pivoting of the saw plane without permitting the saw to fall below the position shown upon Figure 3 at any point in the translation of its frame along the channels.

For positively moving carriage 124 in guided translation as just described, a shaft 138, Figure 15, has pinions 138a and 138b fixed to its respective ends each of which is maintained in mesh with a respective rack 122 and 119a, whereby shaft 138 and, correspondingly, carriage 124, are moved in translation only. Thus the carriage is mounted for guided translation along the channel members from an operating position shown upon Figure 3, to an elevated position wherein the saw 128 is vertical and in position above a tree trunk resting upon the conveyer rollers so that, thereafter, the saw may be positively moved downwardly in a vertical plane, to sever the trunk into selected lengths.

Driving fluid under pressure is supplied to and exhausted from the motors 130 and 134 by a hose assembly 139, Figures 3 and 15, individual hose of which connect a source of fluid under pressure, not shown, with the respective motors 130 and 134, as indicated at 139a and 139b, Figure 15. This assembly extends loosely along channels 118 and 119 to a connection with the rear wall of carriage 124. A cable 140 extends from a spring wound drum 141, Figure 3, within housing 5, downwardly about rollers 142 and 143 to a connection at 140a with a lug 124b of saw carriage 124. At spaced intervals along its length, hose group 139 has rings 139c secured thereto and which are threaded upon cable 140. Thus in an obvious manner, as saw carriage 124 is translated rearwardly and upwardly, cable 140 is wound onto reel 141 and the hose gathers in uniform loops within housing 5, whereby kinking and knotting are avoided and the saw carriage is freely movable to any position along the channels. By this means, the saw may be advanced horizontally into a tree to cut the same at a selected height above ground.

The conveyors

As a tree is severed near its base, its trunk is drawn into the machine and the limbs cut therefrom close to the trunk. During this processing the trunk is supported for movement in the direction longitudinally of the machine, by a forward or primary conveyor 144 and a rearward or secondary conveyor 145.

Referring more particularly to Figures 1, 2 and 3, the primary conveyor 144 comprises right and left bearing members 146 and 152 each rigidly attached to and carried by transverse beams 147 and 148 of the pivoted frame 7. As best shown by Figure 2, these members are positioned in laterally spaced relation and each has a pair of anti-friction bearings (not shown). Each bearing forms a pair with the corresponding opposite bearing of the other member. The forwardly- and rearwardly-disposed pairs of bearings journal shafts 153 and 154, respectively, to which are keyed conveyor rollers 155 and 156. Clearly shown upon Figure 2, these rollers have the general shape of a hyperboloid. Their surfaces are preferably roughened or provided with spikes or teeth to afford a better grip upon the log. The curvature of rollers 155 and 156 in cross section taken in planes through their axes, is such as will fit or accommodate the trunk of the largest tree which the machine is capable of processing. Each of these rollers has a sprocket such as 157, Figure 1, fixed to its supporting shaft at the left end thereof. These sprockets are connected for synchronous rotation by a chain 159 as will be subsequently described. See Figures 1 and 2.

In addition the shaft 153 of roller 155 has a second sprocket 174 secured thereto between the end of the roller and sprocket 157. A hydraulic motor 172 is bolted to a bracket carried by frame 7 and has a sprocket (not shown) fixed to its shaft directly below sprocket 174. A chain 173 passes about the aforementioned sprockets so that upon energization of motor 172, rollers 155 and 156, as well as 177 and 178, are driven synchronously.

As clearly shown upon Figures 2 and 3, bearing frame 146 journals two upright screws 163 and 164 while frame 152 has two similar screws 165 and 166. Each screw is carried in a thrust bearing 163a, 164a, 165a, and 166a in its corresponding frame and threadedly engages a respective one of a plurality of sleeves, such as 168 of frame 162, Figure 3. Each screw extends upwardly beyond its sleeve and has a sprocket keyed to its upper end. A hydraulic motor 169 is rigidly secured to frame 177 by a bracket, not shown, and has a sprocket on its drive shaft in the same plane as the sprockets on the upper ends of screws 163, 164, 165 and 166. A chain 167 interconnects all of the sprockets so that when the motor 169 is energized to rotate in one direction or the other, all screws are synchronously rotated and the frame 162 is translated toward or from the rollers 155 and 156. The manner in which motor 169 is controlled will be described subsequently in connection with the detailed description of the entire hydraulic system.

The upper portion of the main conveyor being described, includes an auxiliary rectangular frame 170 mounted just below frame 162 (see Figure 3) and mounted for limited vertical translation on and along the four sleeves such as 168, suitable stops, not shown, being provided to limit the translation to not more than a few inches. Four identical coil springs, two of which are indicated at 171, Figure 3, are provided, one adjacent each sleeve. These springs act between frames 162 and 170 to urge the latter to its downwardmost position.

Pressure rollers 160 and 161 are journaled in bearings fixed to and depending from frame 170. Each roller is positioned over a corresponding one of driven rollers 155 and 156. Rollers 160 and 161 have the same general contour in axial section, as the lower rollers, but are not power driven. In Figure 3, the assembly including frames 162 and 170 is positioned at its upper limiting position on screws 164, etc. In response to actuation of motor 169, the assembly can be lowered until rollers 160 and 161 contact and firmly press a log onto rollers 155 and 156 under the urge of springs 171.

As clearly shown upon Figures 1 and 3, I provide a secondary conveyor 145 positioned upon frame 7 and spaced rearwardly of the primary conveyor just described. This secondary conveyor is in all essential respects identical with the primary conveyor described in detail in the immediately preceding paragraphs. Consequently it is believed to be sufficient to identify the main parts only of this secondary conveyor, as follows: Lower bearing frames 175 and 176, lower rollers 177 and 178, vertical screws 179 and 180 journaled in frame 176, screws 181 and 182 journaled in frame 175, upper frame 183 corresponding to frame 162 of the forward or primary conveyor. Continuing identification of the upper assembly of the secondary conveyor, 184 is the auxiliary frame having limited vertical sliding on and along the four threaded sleeves such as 185 and 186 at the four corners of frame 183. Upper rollers 187 and 188 are journaled in or on frame 184. Four coil springs, two of which are identified at 189, urge frame 184 and rollers 187 and 188 downwardly. Hydraulic motor 190 drives a chain 191 operating in synchronism all of the sprockets secured to the upper ends of the four screws 179, 180, 181 and 182 and, in the same manner as described for motor 169, translates the upper or pressure rollers toward and from the lower rollers.

*The hydraulic control system*

All of the hydraulic motors described in the preceding chapters are controlled by an integrated system centralized in the operator's compartment of the vehicle. This system is shown schematically upon Figure 13.

A high capacity, high pressure pump 192 has an intake pipe 193 and a delivery pipe 194. A by-pass 195 is provided, including a pressure regulator 196. The delivery pipe 194 as shown, extends to all of the motors and power cylinders previously described. Beginning at the left end as the parts are viewed upon Figure 13, the power cylinders or hydraulic jacks 60 and 63 and which are effective to pivot the forearms 55 and 56 of the lifting arm assembly, are supplied with pressure fluid under control of a manually-actuated four-way, three position valve 197. When this valve is in the position shown, fluid flows from pipe 194, valve 197 and branch pipes 198, 198a to one side of the pistons in cylinders 60 and 63 while at the same time, fluid exhausts from the other side of the pistons by way of branch pipes 199 and 199a and valve 197, to exhaust line 193 to pump 192. When the rotor of valve 197 is rotated 90° in either direction from the position shown, fluid is introduced to the other side of the pistons in cylinders or jacks 60 and 63 and the movement induced by the valve in the position shown, is reversed. When the valve rotor is turned 45° in either direction from the position shown, flow of fluid to the power cylinders 60 and 63 is cut off and their pistons are held in their positions at the moment of cut-off. Due to the connections described the two rods 59 and 66 will be normally moved equally in the same directions.

Hydraulic cylinder 47 and its rod 49 which, it will be recalled, interconnect clevis arms 37 and 38, is controlled by a valve 200, similar in function and operation to valve 197. Thus when valve 200 is in the position of adjustment shown, fluid flows from supply pipe 194, valve 200 and pipe 201 to one side of the piston in power cylinder 47. Simultaneously fluid is exhausted by way of pipe 202 and valve 200, to the exhaust line 193. When the valve is turned 90° from the position shown, the flow of fluid is reversed and motion of piston rod 49 is reversed. Also turning of the rotor 45° cuts off all flow to and from cylinder 47 and locks its piston in its position at cut-off, to thereby maintain clamping members 62 and 68 at any desired distance of separation within the limits of the machine.

Hydraulic jack or power cylinder 39 has previously been described in connection with Figures 4 and 5, as operable to pivot the lifting arm assembly about the axis of shaft 33 which axis is horizontal in Figure 5. Referring to Figure 13, the admission of pressure fluid to this cylinder is under control of a valve 203, in all respects similar to valves 197 and 200. Therefore, when the valve is in the position shown, pressure fluid passes from pipe 194, through valve 203 and pipe 204 to one side of the piston in cylinder 39, while fluid is exhausted by pipe 205, valve 203 and pipe 193 to the pump. As in the case of the previously-described valves, rotation of valve through 90° reverses the direction of motion of the piston while rotation through 45° cuts off all flow of fluid to and from the cylinder and in effect, locks the piston in position.

Hydraulic power cylinder 115 has been previously described, particularly in connection with Figure 5, as effective to tilt cut-off saw 70 about a normally horizontal fore and aft pivot axis offset from the axis of the saw, to thereby vary the plane in which it rotates. Valve 206 controls the flow of pressure fluid to and from this cylinder. When in the position of adjustment shown, fluid from supply pipe 194 flows through the valve, pipe 207 to one end of the cylinder while fluid is simultaneously exhausted from the other end by way of pipe 208 and valve 206 to exhaust pipe 193. As with the previously-described valves, operation of the piston of cylinder 115 can be reversed by rotating its valve 90° or flow of fluid cut off by rotation through 45°.

Power cylinder 112 has been described principally in connection with Figure 5, as operable to vary the effective distance of the cut-off saw 70 from the central axis of drum 21. Control of motion produced by this cylinder is effected by valve 209 and pipes 210 and 211 in a manner which will be clear from the previous description of valves 197, 200, 203 and 206.

Power cylinder 99 has been described in connection with Figure 11, as effective to vary the plane of saw blade 70 with respect to the central axis of drum 21, that is, to tilt the saw about an axis which is, in Figure 5, horizontal and parallel to the plane of the figure. In a manner previously described for the valves 197, etc., motion of the piston in this cylinder is controlled by valve 212 and pipes 213 and 214 extending from the valve to the respective ends of the cylinder. As indicated, this valve is controlled by solenoids 218 and 219. Energization of solenoid 218 effects adjustment of the valve to position saw 70 in the vertical plane, while energization of solenoid 219 effects adjustment of the valve to position the saw in the horizontal plane, that is, the position shown upon Figure 5. Thus, referring to Figure 13, energization of solenoid 218 is by way of line 220, lead 221 to manual, single-pole, double-throw switch 222. When thrown to the left, the circuit continues to on-off single-pole, single-throw switch 223 and thence by line 224 to solenoid 218 and ground at 225. As a safety feature, switch 223 is normally open and is closed automatically by drum 21 only when the latter is rotationally positioned as shown upon Figure 5, that is, the position wherein the axis of saw 70 is in the vertical plane through the axis 22. Consequently, the saw cannot be tilted into the vertical position unless the drum is in the position shown. When switch 222 is thrown to the right, current flows by leads 221 and 226 to solenoid 219 and ground, and valve 212 is adjusted to effect movement of the saw 70 to a position such that its plane is parallel with axis 22.

Hydraulic cylinder 12, which controls the pivotal position of frame 7 about the axis of bearings 9 and 10 has been described in connection with Figures 3 and 12. Admission of fluid to this cylinder or motor is controlled by valve 215, Figure 13, over pipes 216 and 217 so that, in a manner obvious from inspection, the effective elevation of main or cut-off saw 128 above the ground, may be adjusted under control of the operator.

Reversible hydraulic motor 169 has been described in connection with Figure 3, as connected to adjust the top rollers 160 and 161 of the primary conveyor vertically toward and from the lower rollers 155 and 156. This motor is controlled by a four-way, three-position solenoid valve 227 similar to 197, 200, etc., over pipes 228 and 229, so that the direction of rotation of the motor may be reversed by a 90° throw of the valve.

The purpose of rollers 160 and 161 is, of course, to engage and hold a log or tree trunk upon conveyor rollers 155 and 156. Since the diameter of a log varies along the length thereof, I have provided circuit connections by which the motor 169 is controlled, when desired, to automatically maintain the rollers in contact with the log.

Referring to Figure 13, it will be seen that the circuit connections to solenoids 230 and 231 controlling valve 227 include an operating control switch 232, a manual switch 233 and limit switches 234 and 235. Manual switch 233 is located on the control panel within the operator's cab and is a double-throw instrument having two poles engaged by throw in one direction and a single pole engaged by a throw in the other direction. When thrown so that the two poles are closed, control of the valve 277 is turned over to the operating control switch 232 as subsequently described. When switch 233 is thrown so that its single pole is closed, a circuit is closed which extends from line 220, lead 236, switch 232, lead 237, switch 233, lead 238, switch 234, lead 239 and solenoid 231 to ground. The rolls are thereby moved into their upper position.

The control switch 232 is carried by frame 162 or a bracket, not shown, attached thereto, in position adjacent or between the rollers 160 and 161. Referring to Figure 13a, there is shown schematically a suitable control switch consisting of a casing 300 having a switch arm 301 pivoted thereto at 302 for movement upward into contact with a terminal 303 or downward into contact with a terminal 309. The arm 301 is forked at its free end to engage with a smooth fit between circular flanges 310 fixed in axially spaced relation on a rod 304 rotatably and slidably mounted by and between pierced brackets 305 and 306 fixed to casing 300. The lower end of this rod is bent as shown and there journals a feeler or contact roller 307. A coil spring 308 surrounds the upper portion of the rod and acts between bracket 305 and upper flange 309 to urge the rod downwardly. Bracket 306 is conveniently positioned to limit downward movement of the rod.

Switch 232 is preferably positioned upon frame 162 so that roller 307 lies a little rearwardly of roller 160 and, when in the position corresponding to the control or open-circuit position of Figure 13a, lies about in a line determined by the lowermost points of the minimum diameters of rollers 160 and 161.

The operation in automatic control will be clear from the foregoing description in connection with Figures 13 and 13a. When a log is being moved on and by the rollers and switch 233 is in upper position, the roller, being urged to its lowermost position by spring 308, closes the circuit through solenoid 230 to effect downward motion of the rollers. As these move into contact with the log, switch 232 with roller 307 also moves into contact therewith and on continued downward movement of the switch, arm 301 is pivoted upwardly first to neutral or open-circuit position. Should the rollers be moved downwardly beyond open-circuit position, arm 301 makes contact at 303 and solenoid 231 is energized to cause an upward adjustment of the rolls. Thus, as long as manual switch 233 is thrown to the double-pole position, the presser rolls 260 and 261 are automatically held in position to operatively press a log upon lower rollers 155 and 156.

The circuits are traced as follows: Assuming switch 233 to be thrown into its normal operating position, that is, into a position wherein the two poles are closed, and the frame 162 at some position in which roller 307 does not engage a log resting on rollers 155 and 156, switch arm 301 is moved into the down position and a circuit is closed which proceeds from line 220 to lead 236, switch 232, contact 309, lead 240, switch 233, lead 241, switch 235 and lead 242 to solenoid 230 and ground, to effect an adjustment of valve 227 causing motor 169 to move frame 162 downwardly. Likewise, when the arm 301 of switch 232 is moved to the up position by engagement of roller 307 with a log, a circuit is closed by way of lead 236, contact 303 of switch 232, lead 311, switch 233, lead 238, switch 234 and lead 239 to solenoid 231 and ground. Valve 227 is thereby adjusted to effect movement of frame 162 upwardly.

In a manner obvious from inspection of Figure 13, switch 233 is so wired that when thrown to its single pole position solenoid 231 is closed and, of course, the upper rollers moved upwardly irrespective of the position of adjustment of switch 232.

Motor 190 has been previously described in connection with Figure 3, as being reversible to effect a corresponding upward or downward motion of presser rollers 187 and 188 of the rearward or secondary conveyor. This motor is controlled by a valve 243 in all respects similar to valve 227 and controlled in the up and down motions by solenoids 244 and 245, respectively, since the switches and circuits which control these solenoids are identical with those previously described for solenoids 230 and 231, it will be sufficient to identify operating control switch 246, manual switch 247 and limit switches 248 and 249. As in the case of switch 233, throw of switch 247 to the single pole position energizes solenoid 244 and causes movement of the top rollers to move upwardly. Switch 246 is identical in all respects with switch 232 shown in detail upon Figure 13a. A detailed description thereof and its operation is therefore unnecessary.

Hydraulic motor 172 has previously been described as driving the conveyor rolls or rollers. As shown in Figure 13, this motor is controlled in speed and direction of operation by a manual four-way, three position valve 250 connected with exhaust and supply pipes 193 and 194 and connected with motor 172 by pipes 251 and 252, whereby the direction of rotation may be reversed by a 90° throw of the valve.

Reversible motor 25 has been described in connection with Figure 4 as being connected to rotate drum 21. Referring to Figure 13, it will be noted that this motor is connected with exhaust and supply pipes 193 and 194 in the same manner as described for motor 190, through a solenoid-operated valve 253 and pipes 254 and 255. The valve includes solenoids 256 and 257 under selective control of a manual directional stop switch 258. Thus for a right throw of the arm of switch 258 the circuit is completed from line 220, lead 259, switch 258, and lead 260, including limit switch 261 to solenoid 256 and ground to effect rotation of drum 21 in one direction. When the opposite direction of rotation is desired, the arm of switch 258 is thrown to the left, whereupon the circuit is completed from line 220, lead 259, switch 258, and lead 262, including limit switch 263, to solenoid 257 and ground. Limit switches 261 and 263 are positioned to be opened automatically by the drum in response to its rotation to two respective limiting positions so that overtravel of the drum is prevented.

Hydraulic motor 130 has been described as connected to rotate cut-off saw 128. This motor is schematically shown upon Figure 13 as connected to exhaust and supply lines 193 and 194 by pipes 264 and 265, a manual two-way, two-position valve 266 being connected in pipe 265. Since the saw blade is always rotated in the same direction, motor 130 is not reversible and valve 266 is simply an on-off item, manually actuated.

Reversible hydraulic motor 134 has been described as mounted upon saw carriage 124 to effect translation of the carriage along channel members 118, 119, 120, 121. This motor appears upon Figure 13 from which it is seen that this motor is supplied with pressure fluid from lines 193 and 194, through a four-way, three position valve 267 and pipes 268 and 269. Pipes 264, 265, 268 and 269, of course, form units of the hose cluster or group 139. Valve 267 is electrically operated by solenoids 270 and 271 to position the valve in the directions required to move the carriage 124 up and down, respectively. These solenoids 270 and 271 are energized under control of a manual, two-pole, three position switch 272 which, when the contact-closing arm thereof is thrown to the left, closes a circuit by way of line 220, lead 273, switch 272, and lead 274 including limit switch 275 to solenoid 271 and ground, whereby the carriage 124 is moved downwardly. Likewise, throw of switch 272 to the right closes a circuit which extends from line 220, lead 273, switch 272 and lead 276, including limit switch 277 to solenoid 270 and round, to thereby effect upward movement of the carriage at normal rate.

For the purpose of effecting return of the carriage to upper position at a rate more rapid than normal, as when it is desirable to save time in cutting a tree trunk into logs, I provide a hook-up which includes a supply pipe 279 from pipe 194 to valve 267. This supply pipe 279 includes a section having a restriction 280 which is sufficient to supply fluid for a normal rate of operation of motor 134. The restriction is by-passed by a pipe section including a normally closed on-off valve 281 moved to the open position by energization of a solenoid 282. From Figure 13, it will be noted that a branch lead 283 extends from limit switch 277 to solenoid 282 and ground and includes "quick-up" switch 278. Therefore, in an obvious manner, when switch 272 is thrown to the "up" position, that is, to the right as the parts are viewed upon Figure 13, and switch 278 is closed, solenoid 282 is energized and valve 281 is positioned to by-pass the restriction 280. Fluid then is supplied to motor 134 at an increased rate whereby the motor is driven at a rapid rate to quickly return the saw 128 and its carriage 124 to the limiting upward position. It is to be noted that this rapid motion of carriage 124 is possible in the up direction only.

Motor 73 has been described as driving saw blade 70 which is utilized to trim off limbs of the tree after it has been severed near the ground and is drawn into the machine on rollers 155, etc. This motor is schematically shown upon Figure 13. Since the saw blade always rotates in the same direction, control of motor 73 is effected through pipes 284 and 285 and a manual two way, two position valve 286.

Motor 77 is shown upon Figures 9 and 10, and schematically at Figure 13, and has been described as connected to rotate base or ring gear 75 which in turn mounts saw 70 for rotation upon an axis parallel with but offset from the rotation axis of the gear, to thereby vary the position of the saw with respect to the axis of drum 21. This motor is therefore reversible and under control of a solenoid-operated four-way, three-position valve 287. This valve includes solenoids 290 and 291 selectively energized under control of a switch 292. Thus when the arm of switch 292 is thrown leftwardly as the parts are viewed upon Figure 13, a circuit is completed which extends from line 220, lead 293, switch 292, lead 294 and solenoid 290 to ground. Valve 287 is thereby adjusted to effect rotation of motor 77 in one direction. When the arm of switch 292 is thrown to the right, a circuit is closed which extends from line 220, lead 293, switch 292 and lead 295 to solenoid 291 and ground. Valve 287 is thereby adjusted to effect rotation of motor 77 in the opposite direction. In order to visually indicate when the saw has the position shown upon Figure 2, that is, a position wherein its axis of rotation lies in the vertical plane through the axis of rotation of drum 21, and to the rear of the axes of tubes 85 and 86 I provide a circuit which extends from line 220, lead 296, finger switch 297, lead 298 and signal lamp 299 to ground. Switch 297 is so arranged that its operating plunger is actuated by a projection or cam on gear 75 so that the switch is closed only when the gear and saw 70 carried thereby, are in the desired position of rotation. At other times, the light will be de-energized.

All valve controls as described in this chapter are located on a control board convenient to the operator in cab 6. Valves 212, 227, 243, 253, 267 and 287 have been described as three-way instruments operated by solenoids connected in the circuits described. These valves may be of the balanced or spool type wherein the spool is spring-urged to central or no-flow position and moved to positions corresponding to full flow in opposite directions in response to energization of a respective solenoid. Motors 73 and 130 which drive saws 70 and 128, respectively, are irreversible constant speed machines and, although not so shown, the valves 286 and 266 controlling these motors may be of the solenoid-controlled on-off type wherein the valves are spring-urged to fully closed position and moved to full open position in response to energization of the solenoids. On the other hand, motors 25, 77, 134, 169, 172 and 190, must be reversible and while valve 250 controlling motor 172 connected to drive the conveyor rollers is not so shown, it, too may be solenoid-controlled as are the valves controlling motors 77, 134, 169 and 190. It is contemplated that the solenoids of the valves controlling these motors may be of the differentially energized type whereby the valve is adjusted to give a speed in one direction or the other, dependent upon the net difference in thrust developed by the two solenoids. Thus, for example in the case of valve 227 controlling operation of motor 169, solenoids 230 and 231 may be fully excited to develop equal and opposite forces upon the valve so that it remains in closed position under such conditions. Then, adjustment of solenoid control rheostats operated by a manual handle in the control cab, may cause differential energization of the solenoids 230 and 231 whereby the force on the valve excited by either solenoid, will preponderate. For example, pivotal movement of the aforesaid control handle in one direction from a central or "valve-closed" position, will move the slider of a corresponding rheostat and a decrease in energization of a corresponding one of the solenoids 230 or 231. Since the second or other solenoid, for this direction of pivotal movement of the handle will remain fully energized, the thrust exerted upon the spring-centralized valve spool is varied and the speed of motor 169 is varied in a first direction of rotation. Likewise pivotal movement of the control handle in the other direction from "valve-closed" position will move the slider of another rheostat to correspondingly decrease the energization of the aforesaid second solenoid and, since the energization of the first solenoid will remain constant for the presently-assumed direction of movement of the control handle, the speed of motor 169 is correspondingly varied in the other or second direction of rotation. All other reversible motors, such as 25, 77, 134, 172 and 190 may have their speeds varied in a like manner, such that their direction of rotation will depend, in each instance, upon the direction and amount of movement of its control lever, from the neutral or "valve-closed" position. It is also contemplated that, in accordance with accepted practice and to prevent vertigo on the part of the operator, the movements of the various valve control levers in the control or operator's cab will correspond with the actual resulting motion of the controlled part. Thus, for example, motor 169 actuating upwardly and downwardly the rollers 160 and 161 of the main conveyor, will be controlled by a lever which is movable vertically or pivotable in a vertical plane; and the controls will be so related that upward and downward movements of the handle or lever will cause upward and downward movements, respectively, of the rollers. Thus the movement of the control handle for each motor will be a natural one and smooth operation of the machine may be attained with a minimum of practice and experience.

*Operation*

The operation of the machine will be generally clear from the foregoing description and will be briefly summarized, it being understood that the machine is capable of a very wide variety of uses and modes and sequences of operation.

Assuming that the machine is in the forest ready for operation, the operator will steer it up to a tree selected for cutting on the side away from which the tree is to fall and set the brakes to prevent rearward movement of the vehicle. At this time it is assumed that the parts are in the positions shown upon Figure 3, except that saw carriage 124 is at or near the top of the channel members 118, 119, 120, 121. The operator checks his instruments to make sure that oil or other fluid is available at proper pressure from pump 192 presently being driven by the motor of the vehicle or, alternatively, by a separate motor carried by the vehicle.

He then operates switch 272 in the selected direction to thereby actuate valve 267 and cause motor 134 to translate the saw carriage and parts carried thereby to a position short of that shown upon Figure 3. Provided that saw blade 128 is not at proper elevation above the ground, valve 215 is actuated to operate cylinder 12 and effect the necessary adjustment.

After making sure that cylinder 47 has been actuated to move clamping discs 62 and 68 apart a distance at least a little greater than the diameter of the tree to be cut, the operator adjusts valve 203 in a direction such as will force piston rod 45, Figure 4, to the right and thus swinging the clamping arms 55 and 56 forwardly out of drum 21. Provided additional forward movement of the clamping discs is necessary or desirable, or if it is desired to adjust the height of the discs relatively to the tree, this may be done by actuation of valve 197 to cause energization of both power cylinders 60 and 63 and thus pivot the forearms 55 and 56 about their pivot pins 57 and 65. By a combined adjustment of valves 197 and 203, the clamping discs may be moved into clamping positions upon diametrically opposite sides of the tree.

Valve 200 is next opened in the direction necessary to draw piston rod 49 into its cylinder 47 and thus draw discs 62 and 68 together until they are in firm clamping engagement with the trunk of the tree.

Valve 266 is next opened and when saw blade 128 is up to speed, valve 267 is again opened to feed the saw carriage and saw forwardly into the tree. At this time, of course, all fluid to motor 134 passes through restricted orifice 280 so that the necessary relatively slow feed of the carriage is effected to force the saw into the tree. Simultaneously, if desired or necessary, the clamping arm power cylinders 39, 60 and 61 can be energized to push the tree away from the vehicle to effect an opening of the cut and avoid binding on the saw. In addition, it is contemplated that a power-actuated pusher arm, not shown, will be provided to push the tree over in the direction in which it is desired to have it fall. When the tree falls, the clamping discs swivel about their universal mountings to the respective arms.

Alternatively, the clamping arms may remain free of the tree until after it has been cut and pushed over in a direction away from the machine, after which the arms are extended to grasp the tree near the base of the severed trunk to lift the same and draw it into the drum 21.

After the tree has been severed and is firmly grasped by the clamping arms, valve 281 is opened by proper actuation of switch 278 and valve 267 is reversed by action of switch 272 to effect a rapid retraction of the saw carriage to its elevated position along the channels. In this position, saw blade 128 is in a vertical plane.

Valve 203 is next actuated to energize power cylinder 39 in the proper direction to swing the clamping arm assembly about the axis of shaft 33 and valve 197 is positioned to energise cylinders 60 and 63 to pivot about points 57 and 65 and thereby simultaneously raise the tree trunk at its base and draw it rearwardly through drum 21 until it rests upon conveyor rolls, or rollers, 155 and 156. Next switch 233 is thrown into the upper or two-pole position and presser rollers 160 and 161 are thereupon automatically moved downwardly into contact with the log whereupon motor 169 is stopped with springs 171 under proper tension and the log firmly gripped between the rollers. The clamping arms are then released in an obvious manner by actuation of valves 197 and 200 until the arms are about in the position shown at Figure 5. In case there is a substantial distance between the large or base end of the tree trunk and the first or lower branches, valve 250 is operated to energize motor 172 and thus pull the trunk into the machine. The distance mentioned may be sufficient to enable the trunk to rest upon rollers 177 and 178 of the rear or secondary conveyor, in which event switch 247 is thrown into the upper or two pole position to energize motor 190 and cause presser rollers 187 and 188 to move downwardly into pressing engagement with the trunk.

When the trunk has been drawn rearwardly by the power-driven conveyor rollers until the first branches are being drawn through the drum, the operator is enabled to position saw blade 70 until it lies in the proper plane to trim off the first limb. This is done by the sequential adjustment of (1) valve 253 to energize motor 25 and rotate drum 21 about its axis until the blade lies in the proper plane angularly about the trunk, (2) valve 209 to energize power cylinder 112 and move blade 70 closely to the trunk and (3) valves 206 and 212, if necessary or desirable, to energize power cylinders 115 and 99, respectively, to bring the blade into the proper angular relation to the trunk or limb, about two mutually normal axes, respectively parallel and perpendicular to the axis of rotation of the drum. Of course, the sequence of operation mentioned can be varied in accordance with the particular work being done, the skill and experience of the operator, etc. In any event the adjustment can be effected practically instantaneously.

When blade 70 is properly positioned with respect to the limb, valve 286 will be opened to drive the blade at high speed and then valve 287 is opened in the proper direction to energize motor 77 and move the blade into the limb. Motor 169 is next energized to draw in the trunk to position for cutting off the next limb.

When the trunk has been thus trimmed and/or is positioned upon conveyor rollers so that the cut end is the desired distance rearwardly of a vertical transverse plane determined by the upper vertical portions of channels 118, 119, 120, and 121, valve 266 is again opened to drive saw blade 128, after which valve 267 is adjusted to energize motor 134 and move the saw carriage vertically downwardly into the trunk to sever it into the desired length. The motor 130 is then de-energized and motor 134 reversed to raise the blade 128 for the next cut.

By a sequence of operations similar to those just described, the remainder of the tree trunk can be trimmed, advanced into the machine, and severed into the same or other selected lengths until the entire tree has been processed into sawing logs. As each log is severed, it can be deposited to the rear of the machine by conveyor rollers 177 and 178 and deposited either onto the ground or onto a truck for conveying to the mill. The entire procedure requires a very short time as compared with the time required for performing the same operations by hand, and a very great saving in time and expense thus effected.

While I have described my invention in the form presently preferred by me, it will be clear that numerous changes, rearrangements, substitutions of equivalents and modifications can be made after a study of the foregoing disclosure. Consequently, I desire that the disclosure be taken in an illustrative rather than a limiting sense; and it is my desire and intention to reserve all modifications within the scope of the subjoined claims.

In the claims, the terms "normally horizontal," "normally vertical," etc., refer to the position of the parts as viewed upon Figures 2 and 3.

Having now fully disclosed the invention, what I claim and desire to secure by Letters Patent is:

1. In a self-propelled logging machine, a chassis, a frame extending longitudinally of said chassis, means mounting said frame on said chassis for pivotal movement about a normally horizontal axis transverse of said chassis, an open ended drum on said frame for rotational movement about an axis fore and aft with respect to said frame, a pair of lifting arms, means mounting said arms to said drum for universal angular movement with respect thereto, and power means carried by said chassis frame and drum for moving said frame, drum, and arms through any and all of the movements aforesaid.

2. A self-propelled logging machine comprising a wheel-supported chassis, a frame extending lengthwise of said chassis, means mounting said frame on said chassis for pivotal movement about a normally horizontal axis transverse of said chassis at the rearward end thereof, means adjustable to pivot said frame about said axis relatively to said chassis, an open-end drum journaled on said frame at the forward end of said frame for rotation about a normally horizontal fore and aft axis, power driven means carried by said frame and connected with said drum to rotatably adjust the same about said fore and aft axis, a shaft adapted to mount a circular saw within the peripheral outline of said drum, means mounting said shaft to said drum for rotation about the axis of said shaft and for pivotal movement about two axes mutually normal to each other and to the axis of said shaft, and individual power means for rotating said shaft and adjusting the same about said two axes.

3. In a logging machine, a frame, an open-ended drum journaled in said frame for rotation about the central longitudinal axis of said drum and having an opening in the side, an outer housing, first means mounting said housing on said drum for movement in said opening and about a first axis substantially parallel with said longitudinal axis, power means connected between said drum and housing and operable to pivot said housing about said first axis to move the same substantially radially of said drum, a shaft having one end within the peripheral outline of said drum and adapted to mount a circular saw thereon, second means carried by said housing and mounting said shaft for angular movement in a radial plane through said longitudinal axis, and power means operable to angularly adjust said shaft in said plane.

4. A machine as recited in claim 3, guide means fixed with said frame and extending from beneath said drum rearwardly and upwardly to a point above the longitudinal axis of said drum, a saw carriage mounted for guided movement on and along said guide means, a second saw, means journaling said second saw on said carriage for rotation on an axis substantially vertical when said carriage is at its forwardmost position on and along said guide means, and power driven means manually controllable to translate said carriage on and along said guide means.

5. In a self propelled logging machine a wheel supported chassis, a longitudinally extending frame pivoted on said chassis at the rearward portion thereof for pivotal movement about a normally horizontally transverse axis, an open-ended drum journaled on said frame for rotation about a normally horizontal fore and aft axis, a pair of gripping arms mounted on and within the peripheral outline of said drum for universal pivotal movement with respect thereto, and for movement toward and from each other, manually controlled power means for rotating said drum and moving said arms as aforesaid, a cut-off saw mounted on and within the peripheral outline of said drum for rotation and universal angular movement with respect to said drum and manually controlled power means operable to rotate said saw and angularly move the same with relation to a sawable object held by and between said arms.

6. In a machine of the character described, an open-end drum, a pair of gripping arms, means individually mounting said arms within said drum for movement in unison about a first axis chordal of said drum and for pivotal movement about individual parallel second axes normal to said first axis, each said arm comprising first and second sections jointed at contiguous ends for relative pivoting about respective third axes normal to said second axes, said first sections being pivotable about said second axes respectively, first power means selectively energizable to pivot said arms as a unit about said first axis and to pivot said arms equally and oppositely in synchronism about said second axes, second power means connected between the sections of each arm to pivot each second section relatively to its first section about a respective third axis, a clamping disc universally pivoted on the free end of each said second section, a circular saw, means mounting said saw on and within the peripheral outline of said drum at a position diametrically opposite said first axis for rotation and adjustment about a plurality of axes normal to each other and to the axis of rotation of said saw, and manually controlled power means energizable to rotate said saw and selectively adjust the same about said plurality of axes.

7. A logging machine comprising an open ended generally cylindrical drum, means journaling said drum for rotation with its axis normally horizontal, a pair of gripping arms mounted on and interiorly of said drum for universal pivotal movement within and extendable out from said drum, a saw journaled on and within the peripheral outline of said drum for rotation about a first axis and for pivotal movement about two axes normal to each other and said first axis, and power means selectively energizable to angularly move said arms and rotate and pivot said saw.

8. In a logging machine, a frame, an open-ended drum journaled in said frame for rotation about a normally horizontal axis longitudinally of said frame, a pair of clamping and lifting arms journaled on said drum for universal pivotal movement about three mutually perpendicular axes, means constraining said arms to equal angular movement toward and from each other, power means selectively energizable for so pivoting said arms about one or more of said axes, a circular saw, a shaft fixed with said saw and mounting the same within the peripheral outline of said drum, means journaling said shaft on said drum for rotation and for pivotal movement about two mutually normal axes perpendicular to said shaft, and power means selectively energizable to rotate and pivotally move said saw.

9. A logging machine comprising, a chassis having ground-supported wheels, a longitudinally extending frame journaled in said chassis on a transverse axis at the rear thereof, said frame extending forwardly adjacent the forward end of said chassis, power-operated means connected between said frame and chassis and operable to pivot said frame relatively to said chassis to a selected position about said axis, an open-end drum journaled on said frame on a normally horizontal fore-and-aft axis, a pair of gripping and lifting arms universally pivotally mounted on and within said drum, a first circular saw journaled on and within said drum for operation on a log gripped between said arms, a second circular saw, means mounting said second saw below said drum for rotation on a normally vertical axis and for translation parallel with the axis of rotation of said drum forwardly of said drum, and power operated means, selectively operable to pivot said arms and operate said first and second saws.

10. In a logging machine, a self-propelled wheeled chassis, a longitudinally extending frame journaled on said chassis at the rear thereof for pivotal movement about a normally horizontal axis, an open-end cylindrical drum journaled on said frame at the forward end thereof, for rotation on a normally horizontal fore-and-aft axis, tree-gripping arms mounted on and within said drum for universal pivotal movement relatively thereto and for motion toward each other in gripping a tree therebetween, a cut-off saw mounted on and within said drum for rotation about an axis normally in a radial plane of the axis of said drum and for translation and rotation of said axis in said plane, a second circular saw, a carriage, means mounting said carriage on said frame for translation from a first position beneath said drum to a second position rearwardly and upwardly elevated with respect thereto, means journaling said second saw on said carriage for rotation on a normally vertical axis when said carriage is in first position, and manually controlled power means selectively energizable to pivot said frame, rotate said drum, manipulate said arms, rotate and adjust said saws and translate said carriage.

11. In a machine of the character described, a wheeled centrally-open chassis self-propelled lengthwise, a longitudinally extending frame pivoted in the open space in said chassis on a normally horizontal transverse axis at the rear of said chassis, a connection between said frame and chassis forwardly of said axis and including a power cylinder energizable to pivot said frame about said axis, guide means fixed with said frame and including a first straight horizontal pass at the lower forward portion of said frame and a second straight vertical pass at the upper central portion of said frame, said passes being connected in a smooth continuous manner by curved intermediate portions of said guide means, a carriage mounted for translation on and along said guide means, a shaft journaled in said carriage and normally vertical when said carriage is traversing said first pass, said shaft being adapted to mount a circular saw on its depending lower end, a first motor carried by said carriage, a driving connection between said first motor and shaft, and power means manually energizable to positively translate said carriage on and along said guide means.

12. A self-propelled logging machine comprising a chassis having front and rear pairs of ground-engaging supporting wheels, a frame pivoted in said chassis at the rear thereof on a normally horizontal transverse axis and extending to the forward end of said chassis, an open-end drum carried by said frame at the forward end thereof for rotation about a normally horizontal fore and aft axis, a pair of lifting and gripping arms, means mounting said arms on said drum for pivotal movement about first, second and third mutually normal axes, manually controlled power means for actuating said arms about said three axes, a carriage, a shaft journaled in said carriage and adapted to have a circular saw fixed on one end thereof, power means on said carriage and drivingly connected with said shaft to rotate the same, guide means fixed to said frame and engaging said carriage to guide the same in translation from a first limiting position wherein said shaft is normally vertical at the lower forward portion of said frame to a second limiting position wherein said shaft is horizontal at the upper central portion of said frame, and manually controlled power means connected with said carriage to positively translate the same in movement on and along said guide means.

13. As a component for a logging machine, a frame having forward and rearward ends, a pair of conveyor rollers journaled in said frame on spaced parallel axes determining a normally horizontal plane, guide means fixed with said frame and including a first straight horizontal pass at the forward end of said frame and below said plane, a second straight vertical pass rearwardly of said first pass and above said plane, and a curved pass smoothly connecting said first and second passes, a saw carriage guided means, a saw shaft journaled in said carriage on an axis normally vertical when said carriage is traversing said first pass, said shaft being adapted to have a circular saw removably secured to its lower end, and first and second power motors carried by said carriage and operable to rotate said shaft and translate said carriage along said guide means, respectively.

14. In a machine of the character described, a horizontally elongated frame, conveyor means journaled in said frame to support a log and convey the same in a horizontal path longitudinally along said frame, guide rails fixed with said frame and extending in a straight horizontal pass at the forward end of said frame rearwardly and upwardly in smooth curves to terminate in a vertical pass above said path, a carriage, means guiding said carriage in translation on and along said guide rails, a shaft journaled in said carriage in position generally perpendicular to said guide rails and adapted to receive a circular saw, and manually controlled power means operable to positively and selectively rotate said shaft and translate said carriage on and along said guide rails whereby a saw on said shaft may sever a tree at its base when said carriage is on said straight horizontal pass, and cut the same into lengths when the tree is on said conveyor means and said carriage is moved along said vertical pass.

15. In a logging machine, a motor-driven self-propelled chassis having front and rear pairs of ground-engaging supporting wheels, a frame having a longitudinal dimension substantially equal to that of said chassis and pivoted in said chassis on an axis transverse of and at the rear thereof, fluid pressure power means connecting said chassis and frame and manually controllable to adjust the pivotal position of said frame, an open-ended cylinder drum journaled in said frame at the forward end thereof for rotation about a normally horizontal fore and aft axis, manually controlled fluid pressure power means operable to rotate said drum, a pair of laterally spaced lifting and gripping arms, means mounting each said arm to the interior of said drum for universal movement about first, second and third mutually normal axes, power means selectively energizable to rotate said arms in the same directions as a unit about said first and third axes, and equally and oppositely about said second axis, said first axis being in chordal relation with said drum, a pair of gripping disks each universally mounted on the distal end of a respective arm, a circular cut off saw, bracket means mounting said saw diametrically opposite said arms, for rotation on a fourth axis normally diametrical of said drum and for pivotal movement about fifth and sixth axes, said fourth, fifth and sixth axes being mutually normal, pivot means mounting said bracket means in said drum for pivoting about a seventh axis parallel with the axis of said drum and circumferentially spaced from said saw, fluid power means selectively energizable to rotate said saw and pivot the same about said fifth, sixth and seventh axes, channel guide means fixed with said frame and extending from a point below and substantially in the plane of the forward face of said drum, rearwardly in a straight path then in a curved path upwardly and terminating in a straight upper vertical path, a saw carriage mounted on said channel guide means for guided translation therealong, power means energizable to positively translate said carriage, a saw shaft journaled in said carriage on an axis generally normal to said guide means and adapted to mount a circular saw on one end thereof, power means on said carriage connected with said shaft to rotate the same, first and second pairs of supporting rollers journaled in said frame with their axes lying horizontally transverse thereof in a common horizontal plane below the axis of said drum, said first pair of rollers lying just rearwardly of said drum and said second pair of rollers lying at the rearward end of said frame, manually controlled fluid pressure power means carried by said frame and connected with all said rollers to rotate the same in unison, a first pair of presser rollers, means journaling each said presser roller above and parallel with a respective one of said first pair of supporting rollers for translation as a unit toward and from said first pair of supporting rollers, a second pair of presser rollers, means journaling each roller of said second pair above and parallel with a respective one of said second pair of supporting rollers for translation as a unit toward and from said second pair of supporting rollers, power means energizable to selectively translate said first and second pairs of presser rollers toward and from the corresponding pair of said supporting rollers, an operator's cab carried by said chassis, and control means in said cab for all said power means.

16. In a self-propelled logging machine, a chassis, a frame, means mounting said frame in said chassis for pivotal movement about a normally horizontal first axis transversely of said chassis, an open-end drum, means journaling said drum in said frame for rotation about a fore-and-aft second axis normal to said first axis, and means carried by said drum to grip a log and move the same through said drum along said second axis.

17. In a machine of the character described, a frame, drum means journaled in said frame for rotation on a first axis fixed with respect to said frame, a pair of log-gripping arms, means mounting said arms on and within said drum means for universal pivotal movement about three mutually normal axes, power means manually energizable to selectively pivot said arms about said axes to grip a log therebetween and move the same parallel with said first axes, a circular cut-off saw, means mounting said saw within said drum means for sawing rotation on its axis and for adjustment about mutually normal second and third axes respectively normal and parallel to said first axis, and power means energizable to selectively rotate said saw for sawing and to adjust the saw about said second and third axes.

References Cited in the file of this patent

UNITED STATES PATENTS

| | | |
|---|---|---|
| 1,956,653 | Onstad | May 1, 1934 |
| 2,310,152 | Ronning | Feb. 2, 1943 |
| 2,365,408 | Hillyer | Dec. 19, 1944 |
| 2,378,554 | Irwin | June 19, 1945 |
| 2,411,623 | Jaques | Nov. 26, 1946 |
| 2,461,384 | Kelly | Feb. 8, 1949 |
| 2,542,952 | White | Feb. 20, 1951 |
| 2,583,971 | Shuff | Jan. 29, 1952 |
| 2,688,350 | Waller | Sept. 7, 1954 |
| 2,707,008 | Bannister | Apr. 26, 1955 |
| 2,729,251 | Brown | Jan. 3, 1956 |

FOREIGN PATENTS

| | | |
|---|---|---|
| 41,800 | Sweden | Jan. 3, 1917 |
| 908,030 | France | Aug. 6, 1945 |